(12) United States Patent
McGee et al.

(10) Patent No.: US 7,284,691 B2
(45) Date of Patent: Oct. 23, 2007

(54) UPDATING SYSTEM FOR ELECTRONIC TICKETS

(75) Inventors: Christopher R. McGee, Aurora, CO (US); David R. Baumgartner, Parker, CO (US); Keith A. Newbrough, Parker, CO (US); Ken Algiene, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/338,134

(22) Filed: Jan. 23, 2006

(65) Prior Publication Data

US 2006/0144929 A1 Jul. 6, 2006

Related U.S. Application Data

(63) Continuation of application No. 10/267,180, filed on Oct. 8, 2002, now Pat. No. 7,083,081.

(51) Int. Cl.
*G06F 17/00* (2006.01)

(52) U.S. Cl. ............... 235/375; 235/381; 235/383
(58) Field of Classification Search ........... 235/375, 235/381, 383; 705/5, 41
See application file for complete search history.

(56) References Cited

U.S. PATENT DOCUMENTS

| | | | | |
|---|---|---|---|---|
| 5,598,477 | A * | 1/1997 | Berson | 380/51 |
| 6,603,568 | B1 * | 8/2003 | Sansone | 358/1.14 |
| 7,044,362 | B2 * | 5/2006 | Yu | 235/375 |

* cited by examiner

*Primary Examiner*—Ahshik Kim
(74) *Attorney, Agent, or Firm*—Townsend and Townsend and Crew LLP (57) ABSTRACT

A method for issuing tickets proceeds by selecting an inactive ticket that includes an identifier. Payment is provided for the ticket, and the identifier and a payment amount is entered into a payment processing device. The identifier is transmitted to a host computer system having a record of the identifier and a status of the ticket. The status of the ticket is then changed to an active status in the host computer system.

39 Claims, 5 Drawing Sheets

UPDATING SYSTEM FOR ELECTRONIC TICKETS

CROSS REFERENCE TO RELATED APPLICATIONS

This application is a continuation of U.S. patent application Ser. No. 10/267,180, filed Oct. 8, 2002, now U.S. Pat. No. 7,083,081.

BACKGROUND OF THE INVENTION

This invention relates generally to the field of tickets, and in particular to tickets that may be electronically activated. In one specific embodiment, the invention relates to tickets that are in the form of cards that are offered for sale when in an inactive state, and that are changed to an active state upon purchase.

Tickets for various attractions and events are generally available for sale at the venue where the attraction or event will occur, such as at a ticket window or gate. In addition to selling tickets at the gate, it is common for organizations to sell passes or admission tickets through retailers and grocery stores. When selling in these retail channels, the tickets or passes typically comprise "live" vouchers and hard stock tickets. Because of security and control requirements, these ticket sales transactions are typically limited to customer service desks. As such, it is often inconvenient to purchase such tickets when shopping at retail locations.

BRIEF SUMMARY OF THE INVENTION

The invention provides various systems and methods that enable consumers to purchase tickets in a more convenient manner. In this way, more event tickets may be sold, thereby providing additional growth and revenue opportunities for event organizers.

According to one particular method, tickets may be offered for sale while in an inactive state. To purchase a ticket, a consumer simply selects the ticket and provides the proper payment amount. The ticket includes an identifier that is entered into a payment processing device along with a payment amount. This information is transmitted to a host computer system that already includes a record of the identifier and the status of the ticket. Upon receipt of the purchase information, the status of the ticket is changed to an active status in the host computer system. Also, a record of the payment amount may also be stored in the host computer system.

When ready to redeem the ticket, it is taken to a venue or redemption location having a redemption processing device where the identifier is entered. The identifier is transmitted to the host computer system to verify that the ticket is active. If so, a response is sent back to the redemption processing device so that admittance into the venue may be gained.

In one particular aspect, the ticket comprises a plastic card having a magnetic stripe or a bar code that includes the identifier. In this way, the identifier may be quickly read, such as with a point of sale device having a card swipe reader or a bar code reader.

In another aspect, the ticket may be associated with a coupon. When making a purchase, the identifier may be entered into coupon processing device (such as a point of sale device) that transmits the identifier to the host computer system to obtain information on the coupon. The coupon information may then be sent back to the processing device for application to the purchase.

In a further aspect, the host computer system may include activation criteria that is associated with certain tickets. When redeeming a ticket, the activation criteria may be evaluated to determine whether the ticket may be redeemed, even if the ticket was activated at the time of sale. For example, the activation criteria may indicate certain dates when the ticket may be redeemed. If the ticket is attempted to be redeemed on a different day, a message may be sent back to the processing device indicating that the redemption date is invalid. As another example, the activation criteria may indicate a number of times that the ticket may be redeemed. For instance, the ticket may be good for two visits, may be a season pass, or the like. If the ticket is redeemed too many times, a message is sent back to the processing device indicating that redemption is denied. Also, the host computer system and/or the ticket may include user verification information to verify the correct user of the ticket.

One particular feature is that the tickets may be coupled to a carrier or a holder that in turn is displayed at the point of sale on a hook. In this way, the tickets may be displayed in a variety of locations within a store and may be easily accessible by consumers. Further, since the ticket is invalid until activated at the point of sale, the ticket may not be redeemed if stolen prior to activation. If the ticket is lost or stolen after activation, the ticket may simply be placed in the inactive state and another ticket issued.

In some cases, the holder may also include a coupon that may be redeemed in the traditional manner when making a purchase. Another feature of the method is that detailed reports showing transaction information may be generated. For example, such reports may include when tickets have been activated, the purchase location, and the amount of payment.

In another feature, the ticket may be associated with a seat. In such cases, a seat identifier, such as a seat number or area may be provided on the ticket or the carrier.

In another embodiment, the invention also provides an exemplary computer system for processing tickets. The computer system includes an input interface, an output interface, and a processing device for receiving data from the input interface and for transmitting data to the output interface. The system also includes a database that is associated with the processing device. The database includes records of ticket identifiers that are associated with tickets and their status. Further, the computer system is configured to change the status of one of the tickets upon receipt of data from the input interface indicating that the ticket has been purchased. In this way, when a ticket is being redeemed, its identifier may be received at the input interface and then processed to determine if the ticket is active. If so, a notification may be sent indicating the active status using the output interface.

The database may also be configured to store a record of ticket purchases and payment amounts. In this way, a variety of reports may be produced relating to ticket purchases and redemptions.

The database may also include activation criteria and may be configured to determine whether an activated ticket also meets the activation criteria. For example, the activation criteria may indicate specific dates when the ticket may be redeemed, the number of times that the ticket may be redeemed, or the like.

DETAILED DESCRIPTION OF THE INVENTION

The invention provides unique tickets that may be used to gain admission to essentially any type of venue, attraction, feature, or the like that traditionally accepts tickets in order to gain entrance. Merely by way of example, the tickets of the invention may be used to gain admission to amusement parks, concerts, airplanes, trains, buses, sporting events, parks, cafeterias, water parks, museums, historical sites, movie theaters, and the like.

The tickets of the invention may be constructed of a wide variety of materials that are capable of storing an identifier that uniquely identifies the ticket. For example, the material may comprise a card (that in turn may be constructed of plastic, card stock, paper, or the like), a computer disk (such as a CD, DVD or the like), or other tangible media. Further, the identifier may be stored in a variety of formats, such as in print, on magnetic media, in bar code format, in a computer processor (also known as a smart chip), or the like.

One feature of the tickets of the invention is that they are in an inactive state until purchased. This permits the tickets to be displayed at a wide variety of locations that require little or no security. If the tickets are stolen, they remain in an inactive state and will be unable to be redeemed. Also, the tickets may be constructed in a relatively inexpensive manner so that they can readily be replaced if stolen. By permitting the tickets to be openly displayed, consumers may easily select them and take them to a point of purchase, such as at a check out counter. For example, the tickets may be hung from a hook that is located near a check out location. To purchase the ticket, the consumer simply needs to remove the ticket from the hook and take the ticket to the check out counter. By offering tickets in this way, it is anticipated that ticket sales may be increased. At the same time, fraud risks may be decreased since the ticket is inactive until purchased. In contrast, typically paper tickets are live at the time of printing and generally cannot be canceled without destroying the actual ticket.

At the time of purchase, the ticket is activated so that it may be used to gain the desired admission. The ticket is activated by simply reading the identifier stored on the ticket and transmitting the identifier to a host computer system that has a record of the current status of the ticket. Along with the identifier, a purchase price may also be transmitted. Once the host computer system has evidence that the ticket has been purchased, the host computer system may change the status of the ticket to an active status.

To redeem the ticket, the identifier from the ticket is once again read and transmitted to the host computer system to verify that the card is active. If so, the host computer system may transmit a message indicating that the card is active so that the patron may be admitted.

A wide variety of devices may be used to read and transmit the identifier to the host computer system. For example, if the identifier is stored in bar code format, a bar code reader may be used. If on a magnetic stripe, then a mag stripe reader may be used. Conveniently, the information regarding the identifier and the payment amount may be transmitted over a network from a point of sale device. Currently, most retail establishments include such devices that are capable of reading the identifier. These devices may be coupled to financial networks (such as a credit card or ATM network) or may have a direct connection to the host computer system. In the former case, the ticket may include information that is used to route the information to the host computer system. Merely by way of example, types of point of sale devices that may be used to capture and/or transmit such information to the host computer system are described in copending U.S. application Ser. No. 10/116689, filed Apr. 03, 2002 the complete disclosure of which is herein incorporated by reference. However, it will be appreciated that the invention is not intended to be limited to a specific type of processing and/or reading device. Further, other ways of transmitting include by telephone (using an IVR system), by contacting a customer service representative or the like. The data may also be transmitted across a variety of networks including telephone networks, credit card networks, wide area networks, the Internet, wireless networks and the like.

Optionally, the host computer system (see element 12 of FIG. 1) may periodically transmit some or all of its information to other computer systems (see element 13 of FIG. 1) so that when attempting to check the status of a ticket, the host computer system does not need to be accessed. For example, an amusement park may have its own database (see element 15 of FIG. 1) that is periodically updated from the host computer system 12. When patrons attempt to use their ticket, the identifier may be compared with the status information in the amusement park database 15.

Optionally, the host computer system may periodically transmit some or all of its information to other computer systems so that when attempting to check the status of a ticket, the host computer system does not need to be accessed. For example, an amusement park may have its own database that is periodically updated from the host computer system. When patrons attempt to use their ticket, the identifier may be compared with the status information in the amusement park database.

In some cases, an authentication process may be desired at the time of redemption. For example, if the ticket is a season pass, the ticket may be modified to include a photo ID (or a separate ID or pass may be issued and the ticket deactivated). As another example, if the ticket is good for only one use, the patron's hand may be stamped if she needs to leave the event.

The host computer system and/or the ticket itself may include information on how the ticket may be used. For example, the ticket may be good for only certain days, certain times of the day, for a certain number of uses, or the like. If such criteria are stored on the host computer system, a check will be made both to see if the ticket was activated and whether the activation criteria are met. For example, if the ticket is only good on November 24, and the ticket is redeemed on November 23, the host computer system may indicated that the ticket may not be redeemed on that date, even if properly activated at the time of purchase. In cases where the restrictions are listed on the ticket itself, they may simply be read at the time of redemption to see if the ticket may be redeemed. For restrictions on multiple uses, the host computer system may keep a record of each time the status of the ticket is checked and use this as a record of use.

The host computer system and/or the ticket may also include user verification information that may be used to validate a user. For example, the ticket may be associated with a PIN that is transmitted to the host computer system at the time of purchase. When redeeming the ticket, this PIN may be required. Examples of other validation techniques include the use of scratch off PIN's on the ticket, requiring the user to sign the ticket, including a photo identification on the ticket, and the like.

In cases where a ticket is lost or stolen after activation, the host computer system may receive information on the loss so that the ticket may be placed in the inactive status. The ticket purchaser may then be provided with a new ticket that may be placed in the active state.

The ticket, a carrier for the ticket, and/or the host computer system may also include coupon or loyalty information. In this way, rewards may be provided for purchasing a ticket. For example, such coupons may be redeemable at the retail location where the ticket is offered for sale. When coupon or loyalty information is stored at the host computer system, the coupon or loyalty reward may be redeemed by simply transmitting the ticket identifier to the host computer system to validate the request. The coupon or loyalty data may then be transmitted back to the point of sale device.

The host computer system may also generate a wide variety of reports. The information that may be included in the reports include, for example, numbers of tickets purchased, dates of purchase, locations of purchase, purchase prices, numbers of tickets redeemed, numbers of tickets reported lost or stolen, dates that tickets were redeemed, locations of redemption, and the like. Coupon and loyalty accumulation and/or redemption information may also be reported.

In one aspect, the host computer system may be used to generate reports for accounting, matching, reconciliation, settlement and marketing. For example, if tickets were sold at a particular retail location, and the retailer settled with the ticket company for the sales made over a particular time period, then a report could be generated showing the actual number of tickets sold and their value. The information provided by the retailer could then be audited.

Figure 1:
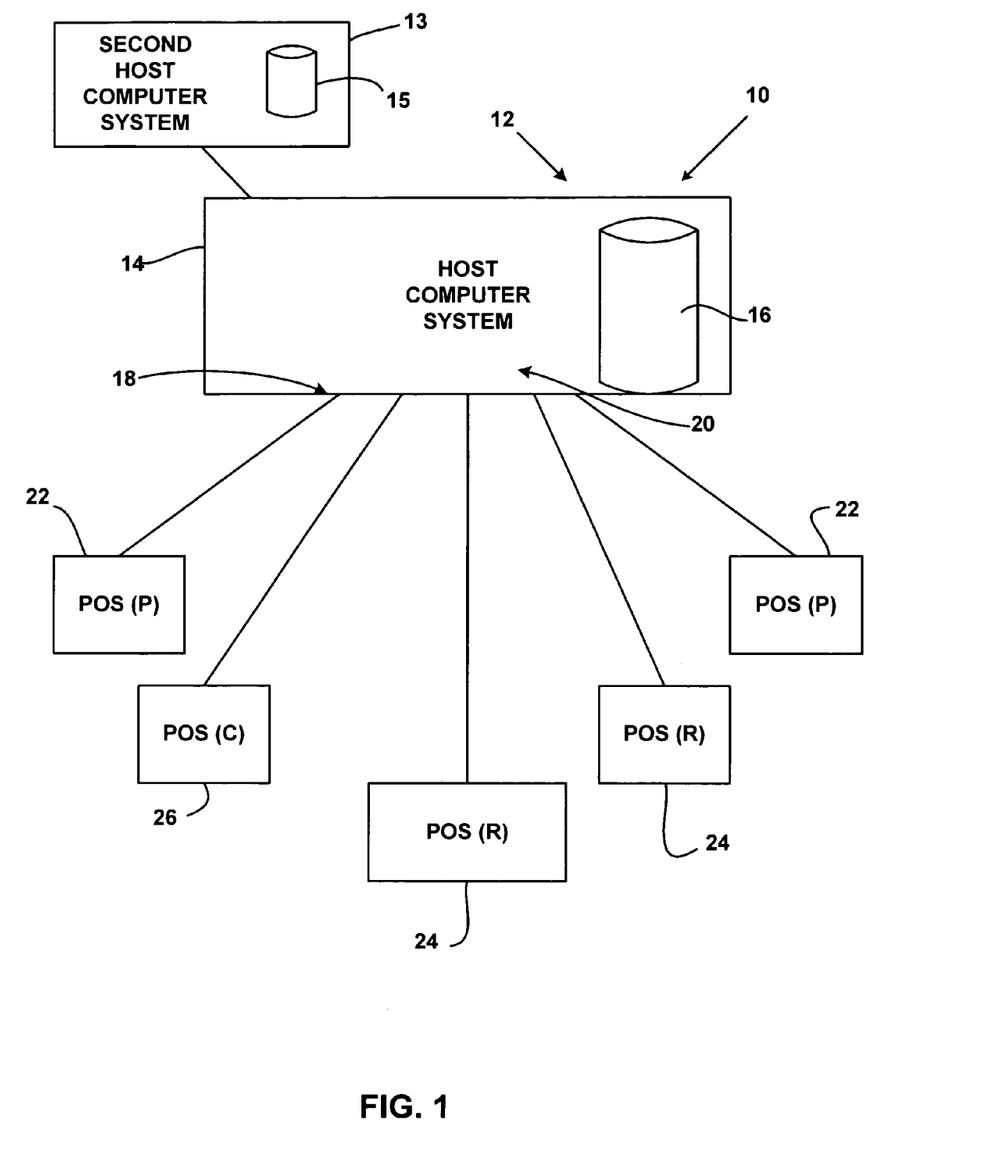
FIG. 1 is a schematic diagram of a system that may be used to activate and redeem tickets according to the invention.

Referring now to FIG. 1, one embodiment of a system 10 that may be used to issue and redeem tickets will be described. Central to system 10 is a host computer system 12 that operates as a central hub and data storage location. As such, it will be appreciated that system 12 may be constructed in a variety of ways, such as by the use of a server computer 14 and a database 16, a mainframe computer, or the like, and that the invention is not intended to be limited to a specific type of host computer system. System 12 also includes input interfaces 18 and output interfaces 20 that permit data to be transmitted to system 12 and to permit data to be transmitted from system 12. One example of such a host computer system is the one utilized by IPS Card Solutions, a division of First Data Corp., to process stored value cards.

One main function of system 12 is to store ticket identifiers for each ticket that is manufactured. Such identifiers may be any unique set of characters that may be used to uniquely identify a given ticket. Merely by way of example, the identifiers may comprise 16 digit numbers. The identifiers are stored both on the ticket and in database 16. System 12 is also able to store information on the status of each ticket. For example, the ticket may be flagged as being inactive when the ticket is initially manufactured. Subsequently, the ticket may be flagged to be active, lost or stolen as described hereinafter.

A wide variety of devices may be used to communicate with system 12 as previously described. However, for convenience of discussion, references will be made to point of sale devices that are configured to read the identifiers from the tickets and to transmit this information to host computer system 12. For example, tickets may be displayed at various locations within a retail establishment. When a buyer is ready to purchase the ticket, the buyer takes the ticket to the checkout counter. Using some type of reader that is coupled to a payment point of sale device 22, also labeled as POS (P), the identifier is read from the ticket and transmitted to system 12. Along with the identifier, other information may also be input into device 22 and transmitted to system 12. For example, the price of the ticket may also be input. When system 12 receives information on the purchase, it may flag the record of the ticket in database 16 as "active." Optionally, a confirmation may also be transmitted back to device 22 to indicate the active status. Database 16 may also record the date and time of purchase, as well as the location of device 22 that was used to complete the transaction. This data may subsequently be organized into various reports using system 12.

When in the active state, the ticket may be taken to an appropriate redemption location, such as an amusement park, theater, sporting event, or the like as previously described. Using a similar or different type of point of sale device 24, also labeled as POS (R), the identifier is again read from the ticket and transmitted back to system 12 which checks the status of the ticket and returns a reply back to device 24. If the ticket is active, the patron may be admitted. The ticket may optionally be collected, or simply flagged as inactive in database 16 if it is a one time use ticket. If a multiple use ticket, a record may be kept that the ticket has been used one time. Also, a ticket may be tracked for multiple uses in a single day or date range. Also, database 16 may store information on the date and time of redemption as well as the redemption location for future reporting. If host system 12 includes activation criteria, these may also be checked to determine whether the ticket may be used. For example, if system 12 includes criteria indicating that the ticket is only good for a specific date, a message may be sent back to device 24 indicating that the ticket is not valid if redeemed on the wrong date.

Host computer system 14 may also include coupon or loyalty information. In this way, the ticket may also be used to claim or redeem a coupon or reward. For instance, the ticket may be offered with a coupon that may be used for $5 off the next purchase at certain retail store, such as where the ticket was purchased, once the ticket has been used to gain admission to an event. In this way, the consumer may return to the store and make a purchase. To obtain the $5 coupon, the ticket is simply presented and the identifier is read by a point of sale device 26, also labeled POS(C), that may be the same or similar device as was used to purchase or redeem the ticket. The identifier is transmitted to system 12 that looks to see if a coupon is associated with the identifier. If so, this information is transmitted back to device 26 where the discount may be applied. A similar scenario may be used to redeem and claim loyalty rewards.

Figure 2A:
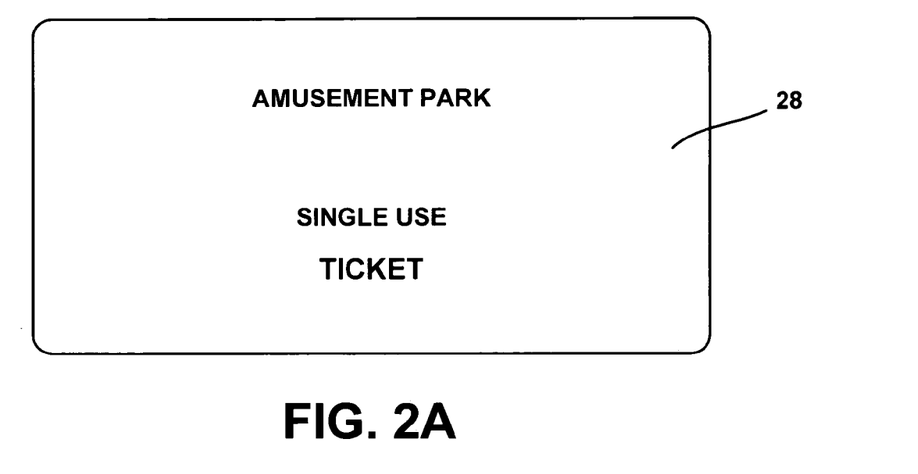
FIG. 2A is a front view of one embodiment of a ticket according to the invention.
Figure 2B:
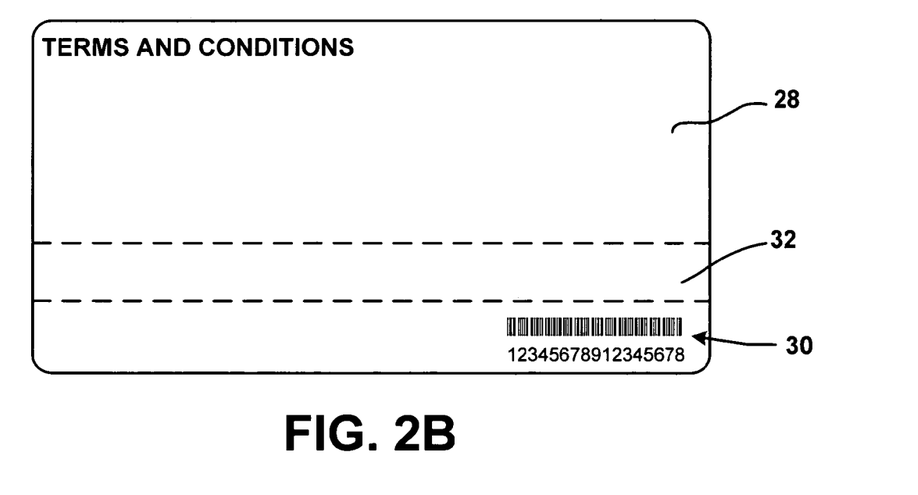
FIG. 2B is a rear view of the ticket of FIG. 2A.

FIGS. 2A and 2B illustrate one embodiment of a ticket 28 that may be used with system 10. Ticket 28 may be constructed of a plastic card and have include various labels, advertising, terms and conditions, legal notices, coupons, seat numbers and the like. Ticket 28 also includes a ticket identifier. As shown in FIG. 2B, the identifier 30 may be in bar code format. Alternatively, or in addition to, the identifier may be stored on a magnetic stripe 32 that may optionally be formatted similar to those used on existing credit, debit cards and stored value cards. The format may alternatively be a proprietary format. In this way, the identifier may be read by using a bar code scanner or a mag stripe reader as is known in the art.

Figure 3A:
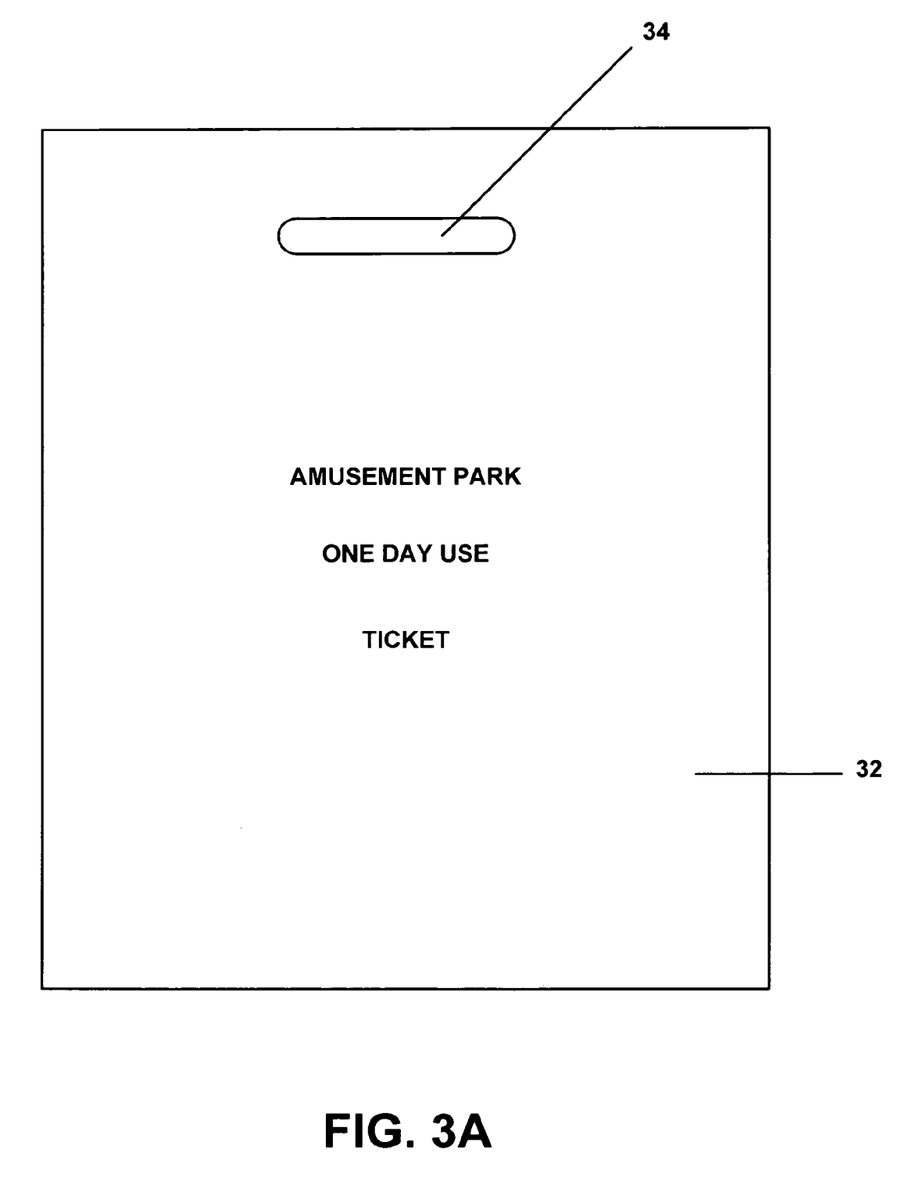
FIG. 3A illustrates a carrier that may be used to hold the ticket of FIG. 2A.
Figure 3B:
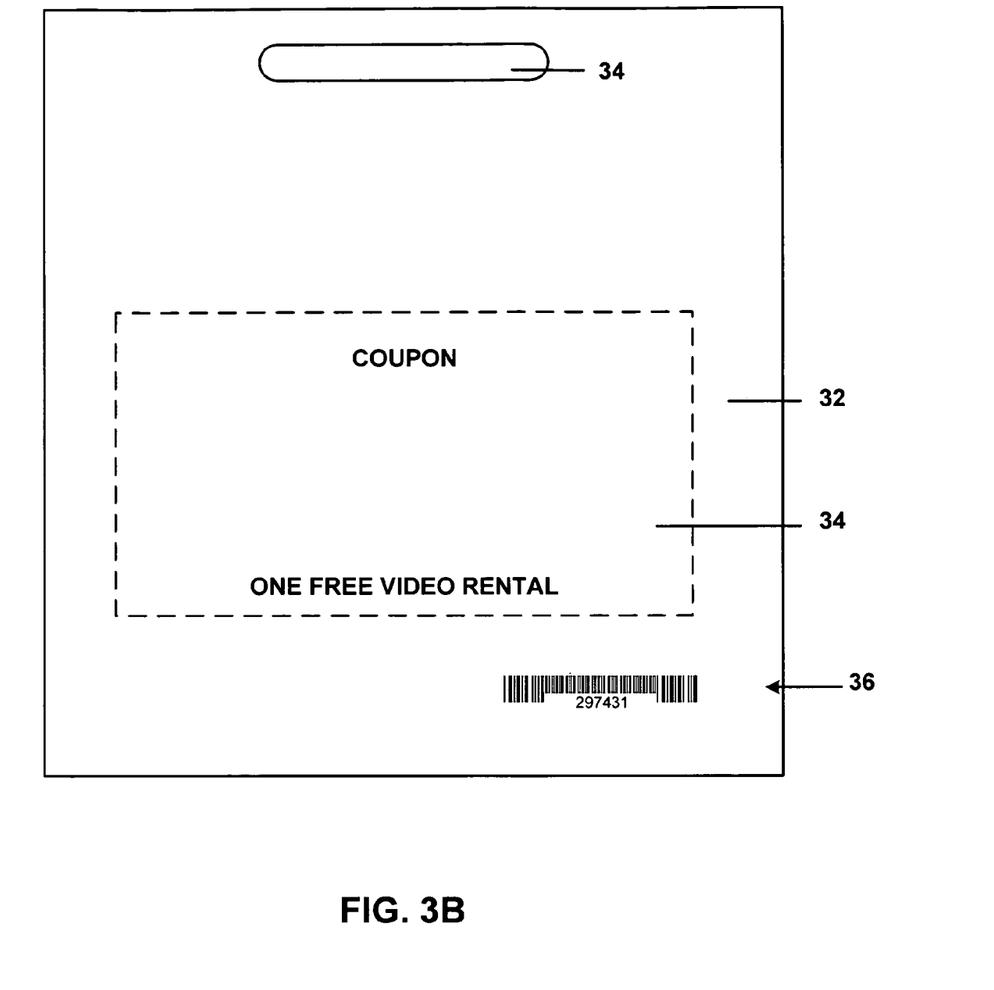
FIG. 3B is a rear view of the carrier of FIG. 3A.

As shown in FIGS. 3A and 3B, a carrier 32 may be used to hold or carry ticket 28. In turn, carrier 32 may include a slot 34 to permit carrier 32 to be held on a hook at a point of sale display. In this way, a purchaser may easily select the ticket by simply grabbing carrier 32 and removing it from the display. Conveniently, carrier 32 may also include a coupon 34 that may be redeemed by simply removing ticket 28 from carrier 32. Optionally, carrier 32 may include its own bar code identifier 36 that is associated with coupon 34. In this way, when coupon 34 is redeemed, bar code 36 may be scanned and checked against the retailer's own database or other third party coupon clearing house or system to obtain information on the coupon. When held to carrier 32, identifier 30 remains accessible so that it may easily be scanned into a point of sale device.

Ticket 28 may be stored at a wide variety of locations on carrier 32. Further, various techniques may be used to removably couple the ticket, such as by a glue, a gel, by breakable tabs and the like Further, a variety of other carriers may be used as well. For example, an assortment of tickets may be held in a bin or a box at a point of sale display.

Figure 4:
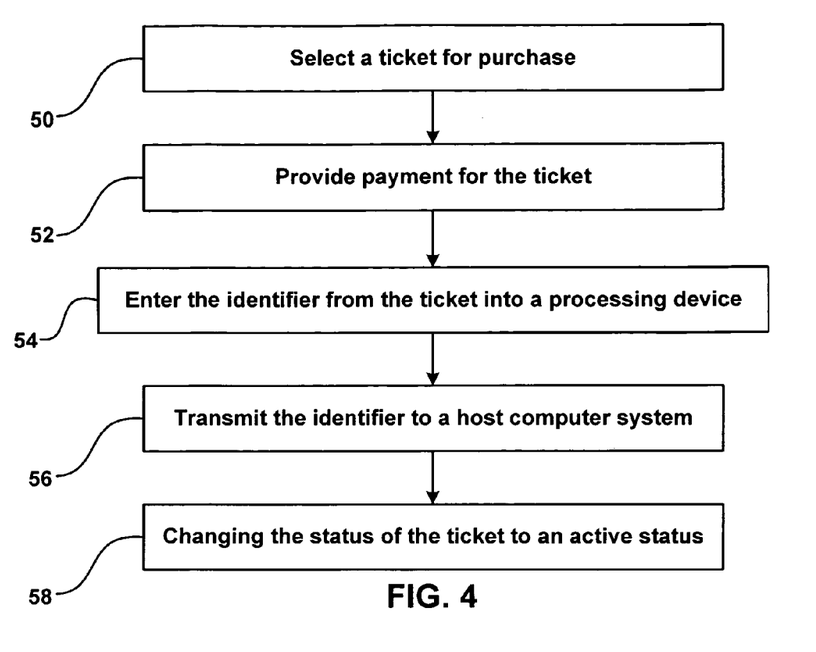
FIG. 4 is a flow chart illustrating one method for issuing tickets according to the invention.

FIG. 4 illustrates one method for issuing tickets according to the invention. In step 50, a ticket is selected by a potential purchaser. The purchaser takes the ticket to a purchase location, such as at a check out counter and provides payment as illustrated in step 52. The identifier from the ticket is entered into a processing device as illustrated in step 54. The identifier is then transmitted to a host computer system as shown in step 56. Upon receipt of the identifier, the host computer system changes the status of the ticket to an active status as shown in step 58.

When the ticket has been activated, it may be used as a "live" ticket. To redeem the ticket, the process outlined in FIG. 5 may be followed. The ticket is taken to a venue or other redemption location as illustrated in step 60. The identifier is read from the ticket as shown in step 62 and the identifier is transmitted to the host computer system to determine if the ticket is active as shown in step 64. Optionally, other activation criteria may be evaluated, such as whether the ticket is being redeemed on the correct day, as shown in step 66. The status of the ticket is transmitted back to the venue as shown in step 68 where admittance may be provided or denied depending on the received status.

Figure 5:
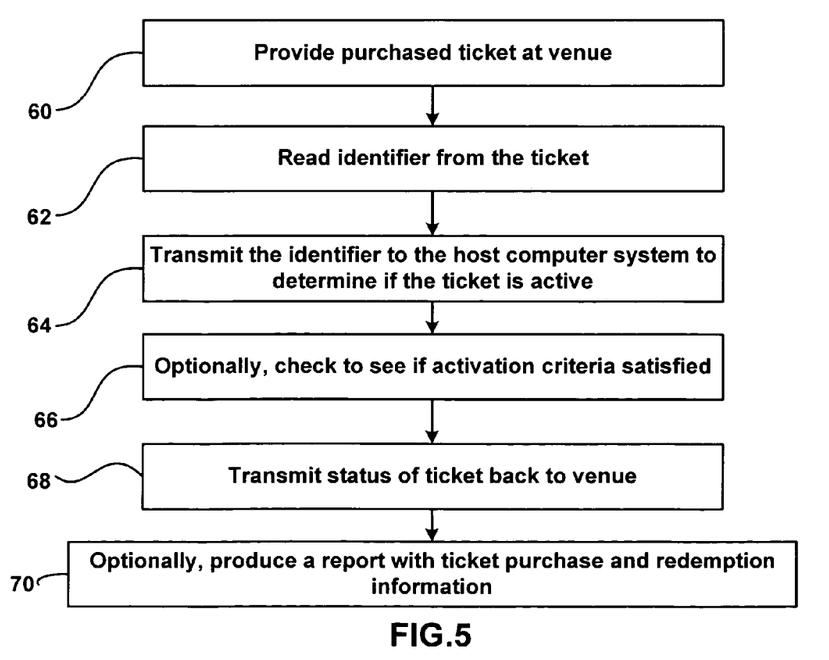
FIG. 5 is a flow chart illustrating one method for redeeming tickets according to the invention.

As shown in step 70, one or more reports may be generated showing ticket purchase and redemption information. These reports may be generated by the host computer system and provided in electronic or printed form.

The invention has now been described in detail for purposes of clarity and understanding. However, it will be appreciated that certain changes and modifications may be practiced within the scope of the appended claims.

What is claimed is:

1. A method for issuing tickets, the method comprising:
   selecting an inactive ticket that includes an identifier, wherein the ticket is usable when activated to gain admittance into a venue for which payment is required for admittance;
   providing payment for the ticket at a site other than the venue;
   entering the identifier and a payment amount into a payment processing device;
   transmitting the identifier to a first computer system having a record of the identifier and a status of the ticket;
   changing the status of the ticket to an active status in the first computer system;
   transmitting information relating to the status of the ticket to a second computer system that is remotely located from the first computer system;
   entering the identifier into a redemption processing device; and
   transmitting the identifier to the second computer system to verify that the ticket is active; and
   wherein the second computer system is associated with an owner of the venue and the first computer system is operated by an independent payment processor.

2. A method as in claim 1, further comprising storing a record of a payment amount in the first computer system.

3. A method as in claim 1, wherein the ticket comprises a plastic card having a magnetic stripe that stores the identifier, and wherein the identifier is entered into the payment processing device using a reader.

4. A method as in claim 1, wherein the ticket comprises a plastic card, wherein the identifier is stored on the card as a bar code, and wherein the identifier is entered into the payment processing device using a reader.

5. A method as in claim 1, wherein the ticket is associated with a coupon, and further comprising entering the identifier into a coupon processing device, and transmitting the identifier to the first computer system to obtain information on the coupon.

6. A method as in claim 1, wherein the first computer system includes activation criteria, and further comprising determining with the first computer system whether the ticket also meets the activation criteria.

7. A method as in claim 6, wherein the activation criteria indicates dates when the ticket may be redeemed.

8. A method as in claim 6, wherein the activation criteria indicates a number of times that the ticket may be redeemed.

9. A method as in claim 1, wherein the ticket is coupled to a holder, and further comprising removing the holder from a hook to select the ticket.

10. A method as in claim 2, further comprising generating a report showing ticket activation information and payment amount information.

11. A method as in claim 1, wherein the ticket is associated with a seat, and further comprising providing a seat identifier on the ticket.

12. A method as in claim 1, further comprising reporting the ticket as lost or stolen, and deactivating the ticket in the first computer system based on the reporting.

13. A method for issuing tickets, the method comprising:
   providing an inactive ticket that is usable when activated to gain admittance into a venue for which payment is required;
   receiving a purchase amount for the ticket at a site other than the venue;
   receiving at a first computer system that is associated with a payment processor an identifier that is associated with a purchased ticket and a purchase amount, wherein the first computer system includes a record of the identifier and a status of the ticket;
   changing the status of the ticket to an active status in the first computer system based on the indicated purchase of the ticket;

transmitting information relating to the status of the ticket to a second computer system that is remotely located from the first computer system and that is associated with the venue;

receiving the identifier from a redemption processing device; and transmitting from the second computer system to the venue processing device information to verify that the ticket is active; and wherein the ticket comprises a plastic card having a magnetic stripe that stores the identifier, and further comprising entering the identifier into a payment processing device using a reader, and transmitting the identifier from the payment processing device to the first computer system.

14. A method as in claim 13, further comprising storing a record of the purchase and the payment amount at the first computer system.

15. A method as in claim 13, wherein the ticket comprises a plastic card, wherein the identifier is stored on the card as a bar code, and further comprising entering the identifier into a payment processing device using a reader, and transmitting the identifier from the payment processing device to the first computer system.

16. A method as in claim 13, wherein the ticket is associated with a coupon, and further comprising entering the identifier into a coupon processing device, and transmitting the identifier to the first computer system to obtain information on the coupon.

17. A method as in claim 13, wherein the host computer system includes activation criteria, and further comprising determining with the first computer system whether the activation criteria is satisfied when a request to redeem the ticket is received.

18. A method as in claim 17, wherein the activation criteria indicates dates when the ticket may be redeemed or the number of times that the ticket may be redeemed.

19. A method as in claim 17, further comprising transmitting a data file from the host computer system to a remote computer system having information on activated tickets.

20. A method as in claim 13, further comprising generating a report showing ticket activation information and purchase amount information.

21. A method as in claim 13, further comprising receiving at the host computer system information indicating that the ticket as lost or stolen, and changing the status of the ticket to inactive.

22. A computer system for processing tickets, the system comprising:

a first host system comprising:
an input interface;
an output interface;
a processing device for receiving data from the input interface and for transmitting data to the output interface;
a database associated with the processing device, wherein the database includes records of ticket identifiers that are associated with tickets and their status, wherein the ticket is usable when activated to gain admittance into a venue for which payment is required for admittance, and wherein the computer system is configured to change the status of one of the tickets upon receipt of data from the input interface indicating that the ticket has been purchased at a site other than the venue such that the ticket is usable to gain admittance into the venue when presented at the venue; and a second host system comprising:
an input interface;
an output interface;
a processing device for receiving data from the input interface and for transmitting data to the output interface;
a database associated with the processing device, wherein input device of the
second host system is configured to receive information from the output interface
of the first host system giving ticket identifiers that are associated with tickets and
their status and to store the information in the database of the second host system.

23. A system as in claim 22, wherein the database of the first host system is configured to store a record of ticket purchases and payment amounts.

24. A system as in claim 22, wherein the output interface of the first host system is configured to transmit information on the status of one of the tickets to a venue processing device.

25. A system as in claim 22, wherein the database of the first host system includes coupon information that is associated with at least some of the tickets, and wherein the output interface of the first host system is configured to transmit the coupon information to a coupon processing device.

26. A system as in claim 22, wherein the database of the first host system includes activation criteria, and wherein the computer system is configured to determine whether one of the tickets also meets the activation criteria.

27. A system as in claim 26, wherein the activation criteria indicates dates when the ticket may be redeemed.

28. A system as in claim 26, wherein the activation criteria indicates a number of times that the ticket may be redeemed.

29. A system as in claim 22, wherein the processor of the first host system is configured to generate a report showing ticket activation information and payment amount information.

30. A method for issuing tickets, the method comprising:

selecting an inactive ticket that includes an identifier, wherein the ticket is usable when activated to gain admittance into a venue for which payment is required for admittance;

providing payment for the ticket at a site other than the venue;

entering the identifier and a payment amount into a payment processing device;

transmitting the identifier to a first computer system having a record of the identifier and a status of the ticket;

changing the status of the ticket to an active status in the first computer system;

transmitting information relating to the status of the ticket to a second computer system that is remotely located from the first computer system;

entering the identifier into a redemption processing device; and transmitting the identifier to the second computer system to verify that the ticket is active;

wherein the ticket comprises a plastic card having a magnetic stripe that stores the identifier, and wherein the identifier is entered into the payment processing device using a reader.

31. A method for issuing tickets, the method comprising:
selecting an inactive ticket that includes an identifier, wherein the ticket is usable when activated to gain admittance into a venue for which payment is required for admittance;
providing payment for the ticket at a site other than the venue;
entering the identifier and a payment amount into a payment processing device;
transmitting the identifier to a first computer system having a record of the identifier and a status of the ticket;
changing the status of the ticket to an active status in the first computer system;
transmitting information relating to the status of the ticket to a second computer system that is remotely located from the first computer system;
entering the identifier into a redemption processing device; and
transmitting the identifier to the second computer system to verify that the ticket is active;
wherein the ticket comprises a plastic card, wherein the identifier is stored on the card as a bar code, and wherein the identifier is entered into the payment processing device using a reader.

32. A method for issuing tickets, the method comprising:
selecting an inactive ticket that includes an identifier, wherein the ticket is usable when activated to gain admittance into a venue for which payment is required for admittance;
providing payment for the ticket at a site other than the venue;
entering the identifier and a payment amount into a payment processing device;
transmitting the identifier to a first computer system having a record of the identifier and a status of the ticket;
changing the status of the ticket to an active status in the first computer system;
transmitting information relating to the status of the ticket to a second computer system that is remotely located from the first computer system;
entering the identifier into a redemption processing device; and
transmitting the identifier to the second computer system to verify that the ticket is active;
wherein the ticket is associated with a coupon, and further comprising entering the identifier into a coupon processing device, and transmitting the identifier to the first computer system to obtain information on the coupon.

33. A method for issuing tickets, the method comprising:
selecting an inactive ticket that includes an identifier, wherein the ticket is usable when activated to gain admittance into a venue for which payment is required for admittance;
providing payment for the ticket at a site other than the venue;
entering the identifier and a payment amount into a payment processing device;
transmitting the identifier to a first computer system having a record of the identifier and a status of the ticket;
changing the status of the ticket to an active status in the first computer system;
transmitting information relating to the status of the ticket to a second computer system that is remotely located from the first computer system;
entering the identifier into a redemption processing device; and
transmitting the identifier to the second computer system to verify that the ticket is active;
wherein the ticket is coupled to a holder, and farther comprising removing the holder from a hook to select the ticket.

34. A method as in claim 33, wherein the holder includes a coupon, and further comprising presenting the coupon at a coupon redemption location.

35. A method for issuing tickets, the method comprising:
selecting an inactive ticket that includes an identifier, wherein the ticket is usable when activated to gain admittance into a venue for which payment is required for admittance;
providing payment for the ticket at a site other than the venue;
entering the identifier and a payment amount into a payment processing device;
transmitting the identifier to a first computer system having a record of the identifier and a status of the ticket;
changing the status of the ticket to an active status in the first computer system;
transmitting information relating to the status of the ticket to a second computer system that is remotely located from the first computer system;
entering the identifier into a redemption processing device; and
transmitting the identifier to the second computer system to verify that the ticket is active;
further comprising reporting the ticket as lost or stolen, and deactivating the ticket in the first computer system based on the reporting.

36. A method for issuing tickets, the method comprising:
providing an inactive ticket that is usable when activated to gain admittance into a venue for which payment is required;
receiving a purchase amount for the ticket at a site other than the venue;
receiving at a first computer system that is associated with a payment processor an identifier that is associated with a purchased ticket and a purchase amount, wherein the first computer system includes a record of the identifier and a status of the ticket;
changing the status of the ticket to an active status in the first computer system based on the indicated purchase of the ticket;
transmitting information relating to the status of the ticket to a second computer system that is remotely located from the first computer system and that is associated with the venue;
receiving the identifier from a redemption processing device; and
transmitting from the second computer system to the venue processing device information to verify that the ticket is active;
wherein the ticket comprises a plastic card, wherein the identifier is stored on the card as a bar code, and further comprising entering the identifier into a payment processing device using a reader, and transmitting the identifier from the payment processing device to the first computer system.

37. A method for issuing tickets, the method comprising:
providing an inactive ticket that is usable when activated to gain admittance into a venue for which payment is required;
receiving a purchase amount for the ticket at a site other than the venue;
receiving at a first computer system that is associated with a payment processor an identifier that is associated with a purchased ticket and a purchase amount, wherein the first computer system includes a record of the identifier and a status of the ticket;
changing the status of the ticket to an active status in the first computer system based on the indicated purchase of the ticket;
transmitting information relating to the status of the ticket to a second computer system that is remotely located from the first computer system and that is associated with the venue;
receiving the identifier from a redemption processing device; and
transmitting from the second computer system to the venue processing device information to verify that the ticket is active;
wherein the ticket is associated with a coupon, and further comprising entering the identifier into a coupon processing device, and transmitting the identifier to the first computer system to obtain information on the coupon.

38. A method for issuing tickets, the method comprising:
providing an inactive ticket that is usable when activated to gain admittance into a venue for which payment is required;
receiving a purchase amount for the ticket at a site other than the venue;
receiving at a first computer system that is associated with a payment processor an identifier that is associated with a purchased ticket and a purchase amount, wherein the first computer system includes a record of the identifier and a status of the ticket;
changing the status of the ticket to an active status in the first computer system based on the indicated purchase of the ticket;
transmitting information relating to the status of the ticket to a second computer system that is remotely located from the first computer system and that is associated with the venue;
receiving the identifier from a redemption processing device; and
transmitting from the second computer system to the venue processing device information to verify that the ticket is active;
further comprising generating a report showing ticket activation information and purchase amount information.

39. A method for issuing tickets, the method comprising:
providing an inactive ticket that is usable when activated to gain admittance into a venue for which payment is required;
receiving a purchase amount for the ticket at a site other than the venue;
receiving at a first computer system that is associated with a payment processor an identifier that is associated with a purchased ticket and a purchase amount, wherein the first computer system includes a record of the identifier and a status of the ticket;
changing the status of the ticket to an active status in the first computer system based on the indicated purchase of the ticket;
transmitting information relating to the status of the ticket to a second computer system that is remotely located from the first computer system and that is associated with the venue;
receiving the identifier from a redemption processing device; and
transmitting from the second computer system to the venue processing device information to verify that the ticket is active;
further comprising receiving at the host computer system information indicating that the ticket as lost or stolen, and changing the status of the ticket to inactive.

* * * * *